United States Patent
Hafner et al.

(10) Patent No.: US 10,902,641 B2
(45) Date of Patent: Jan. 26, 2021

(54) METHODS OF CALIBRATING A CAMERA OF A VEHICLE AND SYSTEMS

(71) Applicant: FICOSA ADAS, S.L.U., Barcelona (ES)

(72) Inventors: David Hafner, Barcelona (ES); Taner Gungor, Barcelona (ES); Sebastian Carreno, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 65 days.

(21) Appl. No.: 16/281,897

(22) Filed: Feb. 21, 2019

(65) Prior Publication Data

US 2019/0259178 A1  Aug. 22, 2019

(30) Foreign Application Priority Data

Feb. 21, 2018 (EP) .................................... 18382101

(51) Int. Cl.
 *G06T 7/80* (2017.01)
 *G06T 7/246* (2017.01)

(52) U.S. Cl.
 CPC ............... *G06T 7/80* (2017.01); *G06T 7/248* (2017.01); *G06T 2207/10016* (2013.01); *G06T 2207/30241* (2013.01); *G06T 2207/30244* (2013.01); *G06T 2207/30252* (2013.01); *G06T 2207/30256* (2013.01)

(58) Field of Classification Search
 CPC . G06T 2207/30244; G06T 2207/30252; G06T 7/80; G06T 7/248
 See application file for complete search history.

(56) References Cited

U.S. PATENT DOCUMENTS

| | | | |
|---|---|---|---|
| 2009/0245690 A1 | 10/2009 | Li et al. | |
| 2009/0290032 A1 | 11/2009 | Zhang et al. | |
| 2013/0307982 A1* | 11/2013 | Kawai | G06K 9/3208 348/148 |
| 2014/0043473 A1* | 2/2014 | Gupta | H04N 17/002 348/135 |
| 2015/0049193 A1* | 2/2015 | Gupta | G06T 3/4038 348/148 |
| 2016/0275683 A1* | 9/2016 | Sakano | B60R 1/00 |

(Continued)

OTHER PUBLICATIONS

Gil-Jimenez, P. et al., "Estimating the focus of expansion in a video sequence using the trajectories of interest points", Mar. 2016, 14 pages, vol. 50.

(Continued)

*Primary Examiner* — John J Lee
(74) *Attorney, Agent, or Firm* — Brooks Kushman P.C.

(57) ABSTRACT

A method for calibrating a camera of a vehicle is provided. The method comprises: generating a camera calibration matrix comprising a first, a second and a third column, wherein the first column of the camera calibration matrix is obtained based on the obtained focus of expansion points, the third column of the camera calibration matrix is obtained based on the obtained plane normal vectors and a second column of the camera calibration matrix corresponding to the cross-product of the first and the third column of the camera calibration matrix is obtained. Then, the camera is calibrated using the obtained camera calibration matrix.

20 Claims, 7 Drawing Sheets

(56) References Cited

U.S. PATENT DOCUMENTS

2017/0213078 A1* 7/2017 Guerrini ................ G06T 7/254

OTHER PUBLICATIONS

Simek, K., "Dissecting the Camera Matrix, Part 2: The Extrinsic Matrix", Aug. 22, 2012, 8 pages, website: https://web.archive.org/web/20140305065946/http://ksimek.github.io/2012/08/22/extrinsic/, retrieved Aug. 6, 2018.

European Search Report for Application No. 18382101.6, dated Aug. 20, 2018, 6 pages.

* cited by examiner

METHODS OF CALIBRATING A CAMERA OF A VEHICLE AND SYSTEMS

CROSS-REFERENCE TO RELATED APPLICATIONS

This application claims priority to EP application Serial No. 18382101.6 filed Feb. 21, 2018, the disclosure of which is hereby incorporated in its entirety by reference herein.

TECHNICAL FIELD

The present disclosure relates to methods for calibrating a camera of a vehicle and systems. Additionally, the present invention relates to computer programs and systems suitable for performing such methods.

BACKGROUND

In motor vehicles, several so called driving assistance systems are known, often just called assistants, using video images captured by a single video camera or by several video cameras arranged e.g. in the front and/or in the back of a motor vehicle to detect e.g. road lane markings and road boundaries, obstacles, other road users and the like, or to survey and/or display the frontal and/or back area of a motor vehicle e.g. when parking.

However, a problem arises with the fact that the camera is not absolutely fixed in position. There are tolerances during the manufacture of the camera and assembly into the vehicle. In addition, and more importantly, the positioning of the camera may vary over the life of the vehicle as the vehicle is driven and subjected to the rigors of the real world. Vibrations from bumpy roads and door slams, the effects of car washes and repair and replacement of various parts, as well as the movement of the pivoting side view mirror housings, can all have an effect in the position (including angular orientation) of the cameras. This may lead to a camera decalibration.

In this respect, the above-commented technical problem of a camera decalibration occurring during practical usage may result in an inexact or wrong position of the camera relative to the vehicle and thereby in inexact or wrong input data for e.g. a driver assistance system (ADAS).

It is possible to calibrate the camera when the vehicle leaves the factory production line. An end of assembly line tester may be used to project predetermined targets in a controlled environment at known distances from the vehicle. Knowing the real physical position of various markers, it is possible to define a transfer function that maps camera pixel locations to real locations, and from this determine an offset to the camera pose. However, this end of line testing method does not solve the problem of being able to independently calibrate the cameras in the field, where there is no controlled environment in which pre-designated markers are situated at known locations. Simply put, it is not possible to use end-of-line assembly line calibration based on predetermined targets in a controlled environment to calibrate a vehicular camera in the field.

Already existing methods for online calibration are based either on the detection of road markings or are based on detecting features on the road. While the firstly mentioned methods lead to a strong restriction of the environments suitable for calibration, the latter ones are prone to errors, since the assumption of a flat road in a certain image region is not always fulfilled.

Examples of the present disclosure seek to at least partially reduce one or more of the aforementioned problems.

SUMMARY

In a first aspect, a method for calibrating a camera of a vehicle is provided. The method comprises: obtaining one or more image frames in a video stream by the camera while the vehicle is in motion, wherein the images frames define an image plane. The method further comprises selecting two or more image points in the image frames, tracking a motion trajectory of each selected image point in the image frames. Then, a plurality of flow vectors based on the motion trajectory tracked are obtained. Moreover, one or more focus of expansion points for the flow vectors in the image plane are obtained, wherein each focus of expansion point is defined by x, y coordinates. Moreover, a ground plane mask in the image plane is identified. Then, three or more flow vectors located in the ground plane mask are identified. An homography matrix configured to relate homogeneous coordinates of two image points of one of the ground plane flow vectors located in the obtained ground plane is determined. One or more plane normal vectors using the homography matrix are obtained. Then, a camera calibration matrix comprising a first, a second and a third column is generated, wherein the first column of the camera calibration matrix is obtained based on the obtained focus of expansion points, the third column of the camera calibration matrix is obtained based on the obtained plane normal vectors and a second column of the camera calibration matrix corresponding to the cross-product of the first and the third column of the camera calibration matrix is obtained. Then, the camera is calibrated using the obtained camera calibration matrix.

According to this first aspect, a method that allows a high precision and real-time calibration of a vehicle camera is provided.

Unlike the prior art, the calibration of the present method is not based on the detection of road markings or specific features on the road e.g. lanes or other longitudinal road features. Additionally, no prior knowledge on the initial positioning of the camera is needed in order to calibrate the camera. Moreover, the present method only requires a single vehicle camera e.g. another camera or a LIDAR is not required.

In another aspect, a computer program product is disclosed. The computer program product may comprise program instructions for causing a computing system to perform a method for calibrating a camera of a vehicle according to the first aspect.

The computer program product may be embodied on a storage medium (for example, a CD-ROM, a DVD, a USB drive, on a computer memory or on a read-only memory).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk.

Alternatively, the carrier may be an integrated circuit in which the computer program is embedded, the integrated circuit being adapted for performing, or for use in the performance of, the relevant methods.

In yet another aspect, a computing system is disclosed. The system may comprise a memory and a processor. The memory may store computer program instructions executable by the processor. The instructions may comprise functionality to execute a method for calibrating a camera of a vehicle.

In another aspect, a system for calibrating a camera of a vehicle is disclosed. The system includes a processor configured to obtain one or more image frames in a video stream from the camera while the vehicle is in motion, wherein the images frames define an image plane. The processor is further configured to selecttwo or more image points in the image frames obtained by the camera and to track a motion trajectory of each selected image point in the image frames and to obtain a plurality of flow vectors based on the motion trajectory tracked. The system further comprises: a focus of expansion point module connected to the camera to be calibrated, wherein the focus of expansion point module is configured for determining one or more focus of expansion points for the obtained flow vectors in the image plane. Additionally, the system comprises a ground plane module connected to the camera, wherein the ground plane module is configured for identifying a ground plane mask in the image plane, identifying three or more flow vectors located in the ground plane mask, determining an homography matrix configured to relate homogeneous coordinates of two image points of one of the ground plane flow vectors located in the ground plane and obtaining one or more plane normal vectors using the homography matrix. Additionally, the system comprises a camera calibration matrix module connected to the focus of expansion point module and to the ground plane module, wherein the camera calibration matrix module is configured for obtaining the camera calibration matrix comprising a first, a second and a third column by determining a first column of the camera calibration matrix based on the obtained focus of expansion points, determining a third column of the camera calibration matrix based on the obtained plane normal vectors, determining a second column of the camera calibration matrix corresponding to the cross-product of the first and the third column of the camera calibration matrix and calibrating camera using the camera calibration matrix.

BRIEF DESCRIPTION OF THE DRAWINGS

Non-limiting examples of the present disclosure will be described in the following, with reference to the appended drawings, in which.

DETAILED DESCRIPTION

Throughout the present description and claims "image plane" should be understood as a two-dimensional space provided as an output of a camera viewing a real three-dimensional space.

Throughout the present description and claims the term "focus of expansion point" should be understood as a point at which parallel lines in a real plane parallel to e.g. a roadway seem to converge in an image plane. Moreover, the terms "focus of expansion point" and "vanishing point" are interchangeable.

Figure 1:
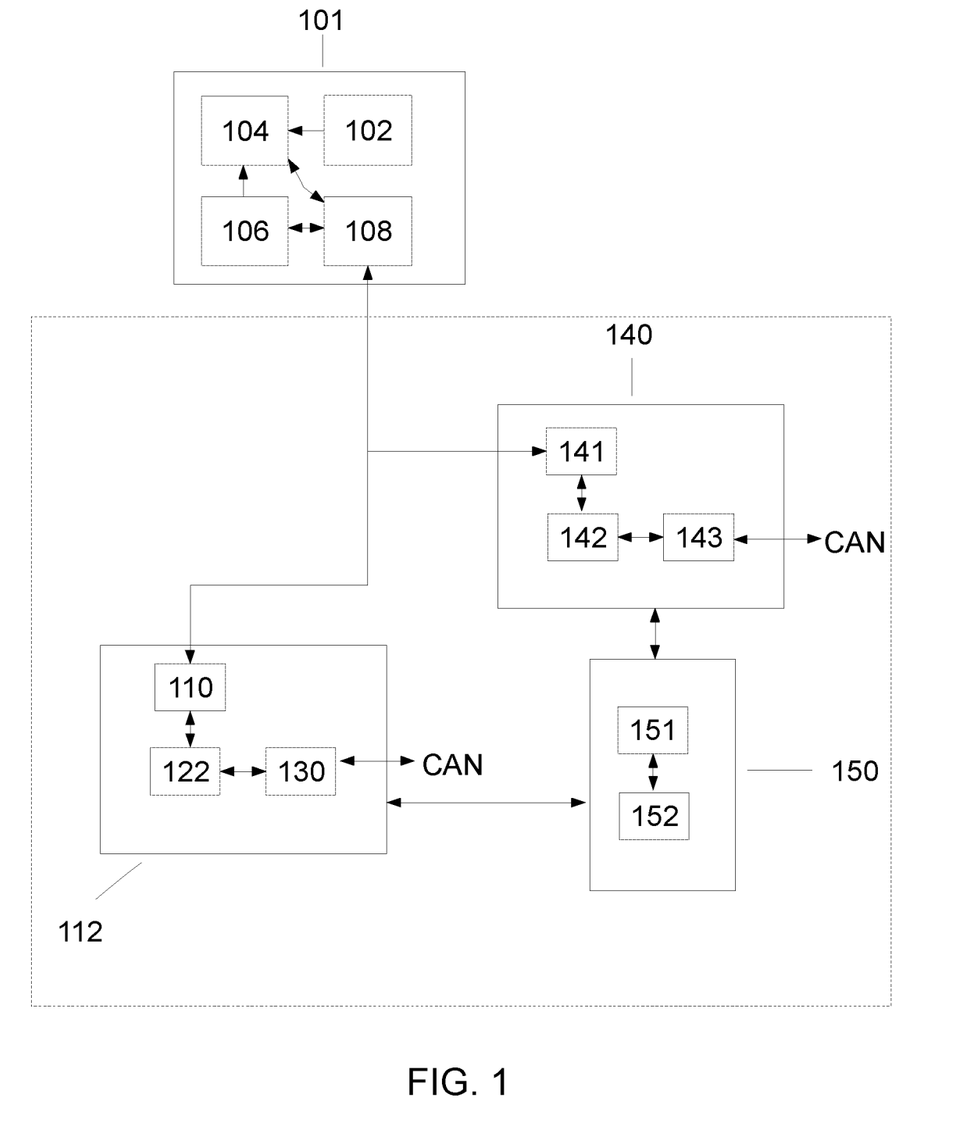
FIG. 1 is an illustration of a block diagram describing an example of a system for calibrating a camera of a vehicle.

FIG. 1 is an illustration of a block diagram describing an example of a system for calibrating a camera of a vehicle. The system comprises a camera 101. The camera 101 further comprises a wide-angle lens 102 coupled to an image sensor 104, a memory 106 and a transmitter 108.

The camera 101 may be coupled via the transmitter 108 to a receiver 110 on a focus of expansion point module 112. The receiver 110 may provide the camera video stream (each stream comprising successive image frames captured by the camera at a rate of e.g. 25-30 frames per second) to a microcontroller 122. The microcontroller 122 processes the selected camera video stream and carries out the focus of expansion point computation as will be described later on.

The microcontroller 122 may be connected to the vehicle command area network (CAN) via a CAN transceiver 130 and thus can query the main vehicle controller (not shown) for information such as the steering angle of the vehicle.

The camera 101 may further be coupled to a receiver 141 of a ground plane module 140. The receiver 110 may provide the camera video stream to a microcontroller 142 which processes the selected camera video stream and carries out the computation of one or more ground plane normal vectors as will be described later on.

Similarly, as before, the microcontroller 142 may be connected to the vehicle command area network (CAN) via a CAN transceiver 143 and thus can query the main vehicle controller (not shown) for information such as the steering angle of the vehicle.

The ground plane module 140 and the focus of expansion point module 112 may be coupled to a receiver 151 of a camera calibration matrix module 150. The receiver 151 may provide the obtained focus of expansion point(s) and the obtained ground plane normal vector(s) to a microcontroller 152 which processes the normal vector(s) and the focus of expansion point(s) and carries out the computation of a camera calibration matrix as will be described with more detail later on.

The microcontroller 152 may further perform the calibration of a vehicle camera using the obtained camera calibration matrix.

Figure 2:
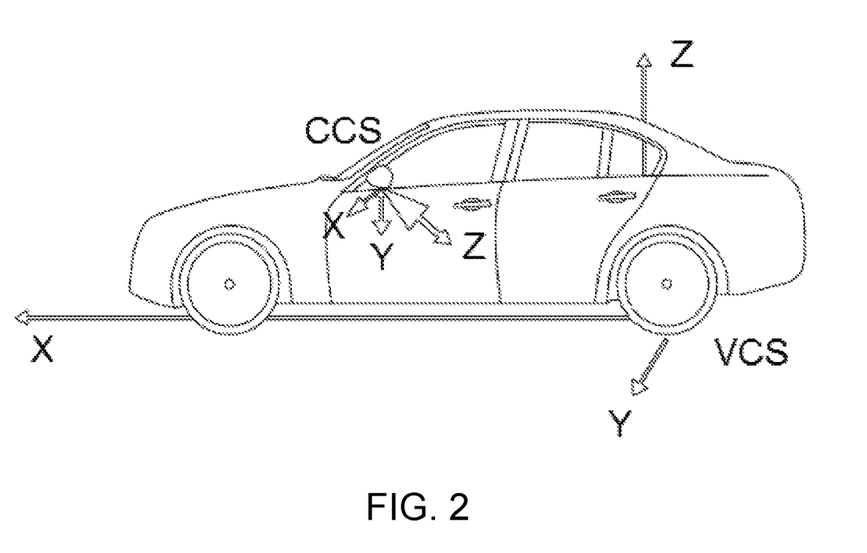
FIG. 2 schematically illustrates an example of a coordinate system of a vehicle (VCS) and a coordinate system of a camera (CCS)

FIG. 2 schematically illustrates an example of a coordinates system of a vehicle (VCS) and a coordinate system of a camera (CCS). The vehicle X-axis may lie along the longitudinal axis of the vehicle. The vehicle Y-axis may lie along the latitudinal or lateral axis of the vehicle. The vehicle Z-axis may be the up-axis of the vehicle. The camera associated with the vehicle may have its own camera coordinate system comprising camera X-axis, camera Y-axis and camera Z-axis. The camera X-axis may point to the right of the camera, the camera Y-axis may point downwards and the camera Z-axis may point away from the camera. The calibration of the camera may be performed so that a rotation matrix is obtained and thus a point from the coordinates system of a vehicle (VCS) may be rotated to the coordinate system of a camera (CCS).

Figure 3:
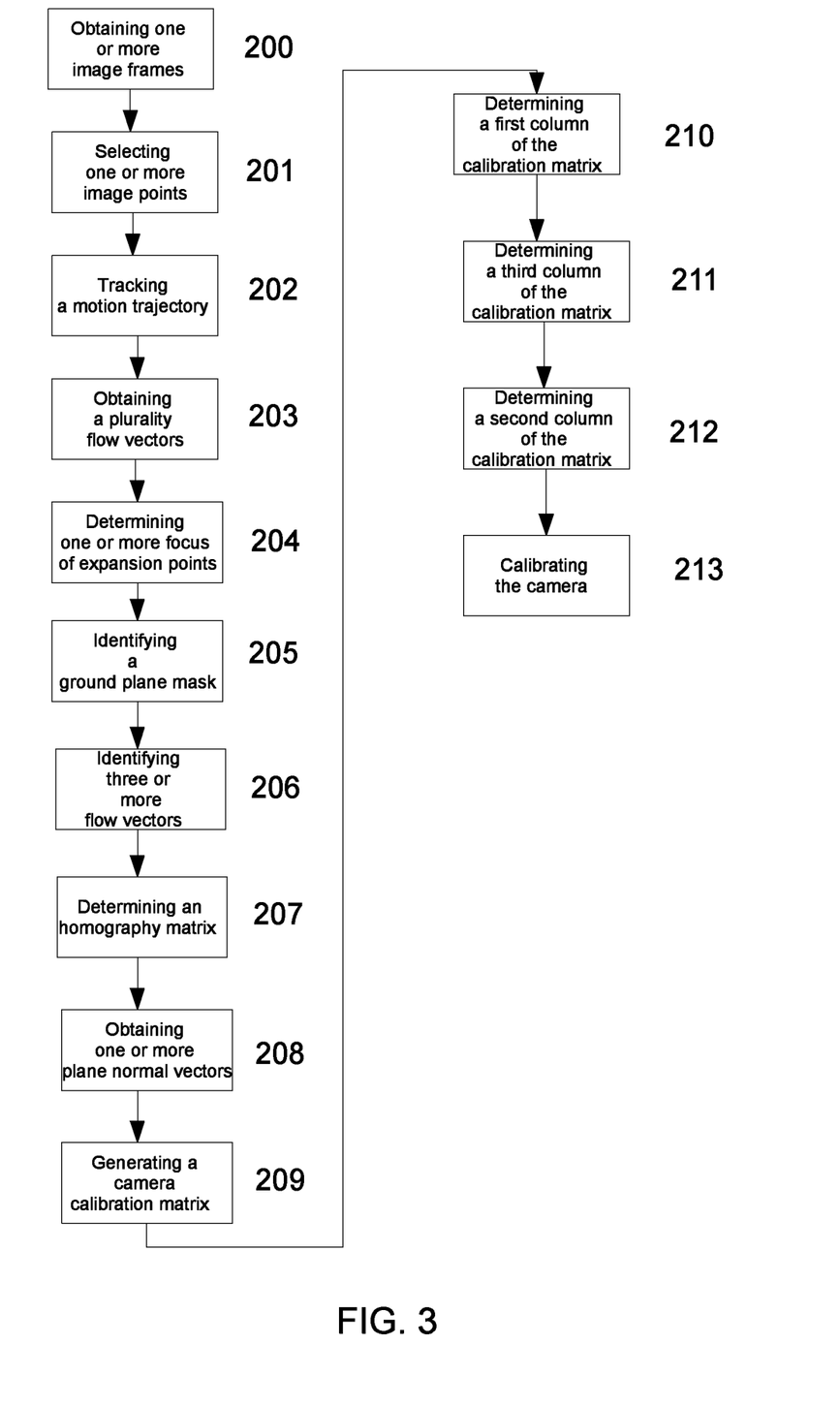
FIG. 3 is an illustration of a flowchart describing an example of a method for calibrating a camera of a vehicle.

FIG. 3 is an illustration of a flowchart describing an example of method for calibrating a camera of a vehicle. Although FIG. 3 shows a specific sequence, it should be understood that other sequences may be followed.

At block 200, one or more image frames in a video stream may be obtained by a camera while the vehicle is in motion, wherein the images frames define an image plane. The processing of image frames at block 200 may be conditioned by the steering angle provided by e.g. CAN bus. In this respect, the steering angle information is recorded an analyzed for every image frame captured by the camera. If the steering angle is within a predefined range of e.g. −3 to +3 degrees, the algorithm may be activated and thus the camera may obtain image frames in a video stream and the camera video stream is processed by the algorithm. However, if the steering angle is not within the predefined range (and thus the wheels of the vehicle are situated at a wrong angle with respect to the body of the vehicle), the algorithm may stop processing image frames captured by the camera. It is thus clear that the algorithm may only be activated when the steering angle is within a predetermined steering angle range.

Figure 4A:
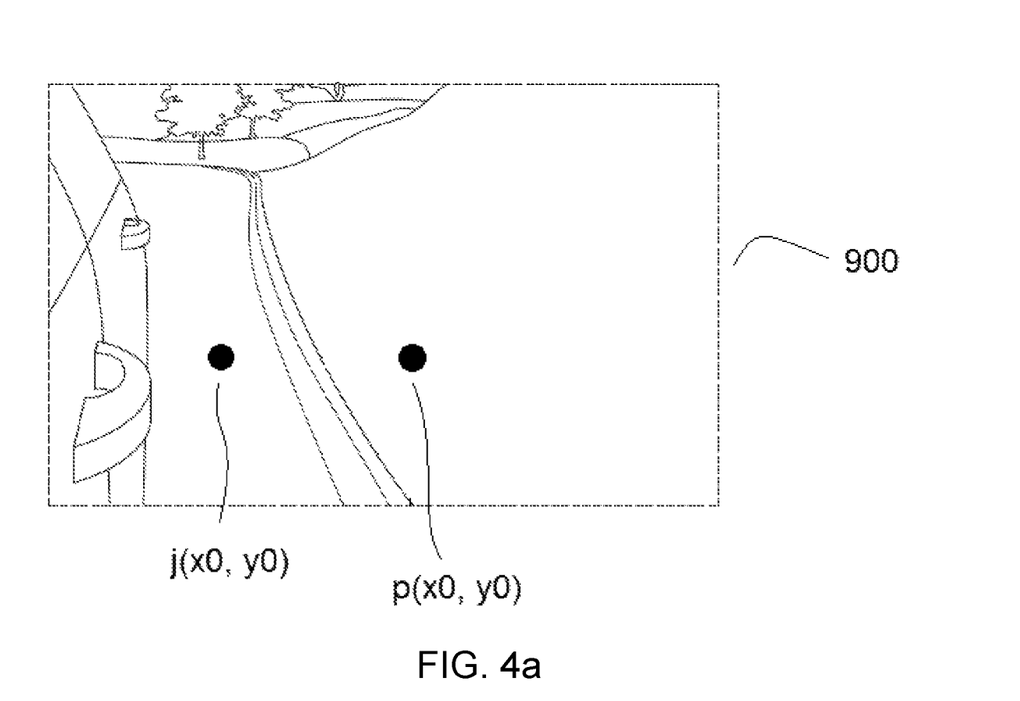
FIG. 4a-4c schematically illustrate a diagram showing the corresponding motion trajectory of an image point over successive image frames in a video stream provided by a camera.
Figure 4B:
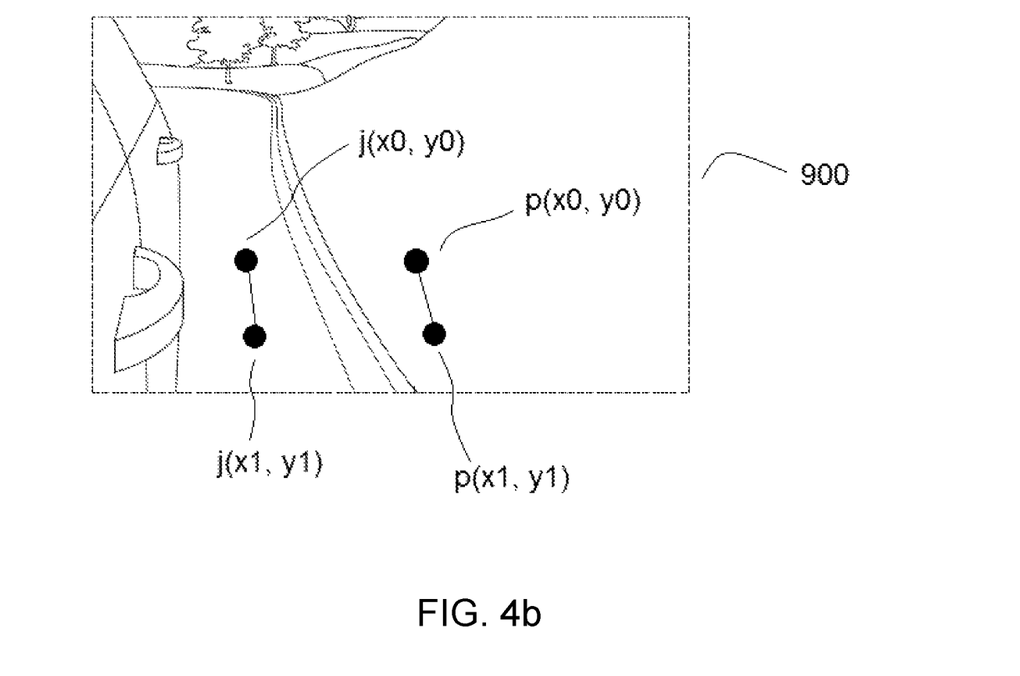
Figure 4C:
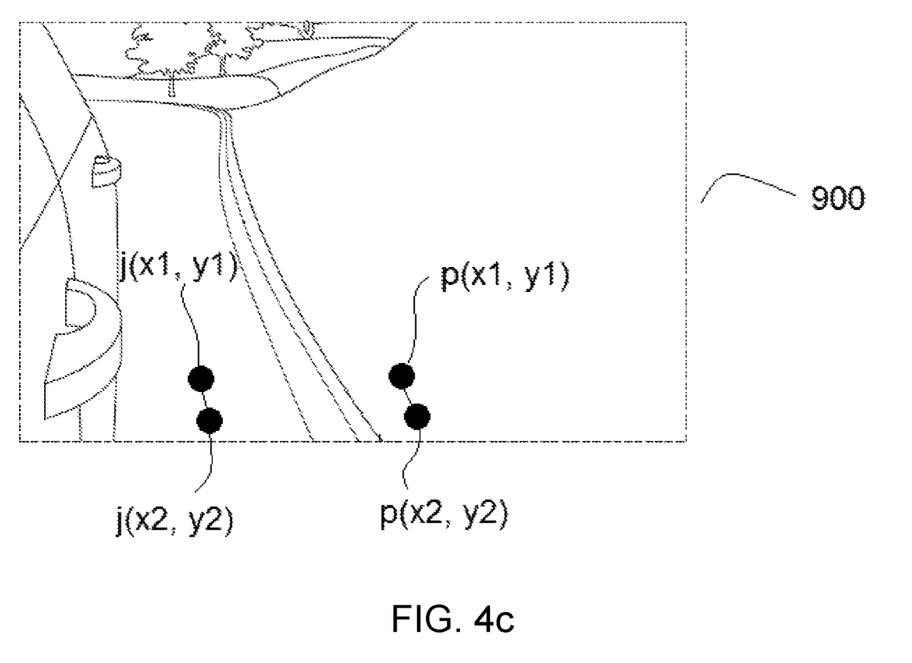

At block 201, one or more image points in the image frames are selected. Moreover, at block 202, a motion trajectory of each selected image point in the image frames is tracked. Additionally, at block 203, a plurality of flow vectors may be obtained, particularly two or more focus of expansion point flow vectors and three or more ground plane flow vectors are obtained. Once one or more image points are selected, the subsequent positions of these points in a set of image frames acquired from the camera video stream as the vehicle moves are tracked. Thus, for example, as schematically shown in FIGS. 4a-4c, image point p and image point j may be tracked at subsequent image frames 900, 901, 902. The pixel positions of this feature point may change over the subsequent image frames to yield, for example, vector P, comprising points (x0, y0), (x1, y1i), . . . (xn, yn), in respect of feature point p. Similarly, the pixel positions of this feature point j may change over the subsequent image frames to yield, for example, vector J, comprising points (x0, y0), (x1, y1i), . . . (xn, yn), in respect of feature point j. Flow vectors e.g. vector P and J for each selected image point may thus be obtained.

Evidently, further flow vectors may be obtained in a similar way.

The flow vectors obtained may be identified as either focus of expansion point flow vectors or ground plane flow vectors. The focus of expansion point flow vectors may be used to obtain one or more focus of expansion points as will be explained later on. The ground plane flow vectors may be used to obtain a one or more plane normal vectors of a ground plane as also will be explained later on.

Typically, the focus of expansion point flow vectors obtained may be noisy and often not reliable. Hence, the focus of expansion point flow vectors may be filtered. The filtering may be performed based on at least one of the following criteria: matching based costs; flow vectors length; angle between image frames and an angle with respect to an initial focus of expansion point. Therefore, "good" flow vectors can be obtained over several frames.

In the matching based cost criteria, the cost of pairing two vectors is given by the result of a pairing function. Particularly, the above-commented cost may be a measure of the similarity and the robustness of the pairing. Therefore, this measure may be used to select the strongest pairings between vectors and disregard the weakest pairings between vectors.

In the flow vectors length criteria, the length of a vector indicates how separated two matched points of two consecutive images are. If the length is very short, the vector may be disregarded since the length of the vector does not provide any information (a minimum of length is needed to project a line towards the expansion focus). Moreover, if the length of the optical flow is too long, it may be considered a pairing error.

In the angle between frames criteria, the angle of the optimal flow vector must be more or less constant. This angle may be used to disregard possible erroneous vectors.

In the angle with respect to an initial focus of expansion point criteria, assuming that the orientation of the initial camera is within a margin of error e.g. +/−3 degrees, this premise can be used to restrict the deviation of the angle of the optical flow vector to the initial focus of expansion.

In some examples, the camera may serve as a mirror replacement. The images frames captured by the camera may thus be mirrored versions of the actual camera images. The flow vectors may thus be flipped such that flow vectors corresponding to non-mirrored image frames are obtained.

Figure 5:
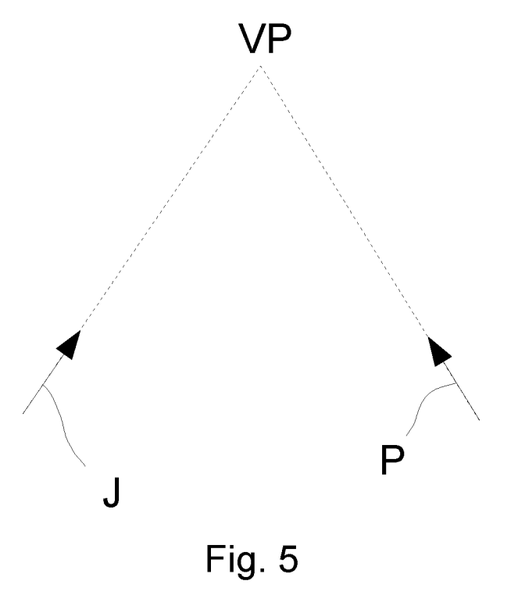
FIG. 5 schematically illustrates a diagram showing flow vectors in an image plane derived from motion trajectories and a focus of expansion point.

At block 204, one or more focus of expansion points i.e. vanishing points for the focus of expansion point flow vectors in the image plane are determined, wherein each focus of expansion point is defined by x, y coordinates. The main goal of this block is to produce focus of expansion points based on the available input data. Following the example, the focus of expansion point VP may be obtained based on flow vectors P and J (previously obtained at block 203) as schematically shown in FIG. 5.

Particularly, the "best" intersection of the flow vectors is computed to determine the focus of expansion points. To this end, the point vp∈R2 that is closest to all the 2D lines (given by the flow vectors) may be calculated. In particular, the absolute distance of a line (given by the flow vectors) with a starting point a, a unit normal vector n and a focus of expansion point vp may be expressed as:

$$\sqrt{(vp-a)^T nn^T (vp-a)}$$

The following (quadratic) function may thus be minimized, in accordance with the following formula:

$$E(vp) = \sum_{i=1}^{n} (vp - a_i)^T n_i n_i^T (vp - a_i)$$

wherein n denotes the number of lines. The solution to this problem may be determined in accordance with the following equation:

$$vp = \left(\sum_{i=1}^{n} n_i n_i^T\right)^{-1} \left(\sum_{i=1}^{n} n_i n_i^T a_i\right)$$

In some examples, the focus of expansion points may be estimated by a random sample consensus (RANSAC) algorithm. The RANSAC algorithim is an iterative method to estimate parameters of a mathematical model from a set of observed data that contains outliers, when outliers are to be accorded no influence on the values of the estimates. An advantage of RANSAC is the ability to perform robust estimation of the model parameters i.e., it can estimate the parameters with a high degree of accuracy.

Evidently, further focus of expansion points corresponding to further flow vectors may be obtained in a substantially similar way. In examples wherein several focus of expansion points are obtained, the obtained focus of expansion points may be filtered. The filtering may be performed by calculating an average of the focus of expansion points obtained. A single average focus of expansion point may thus be obtained.

Figure 6A:
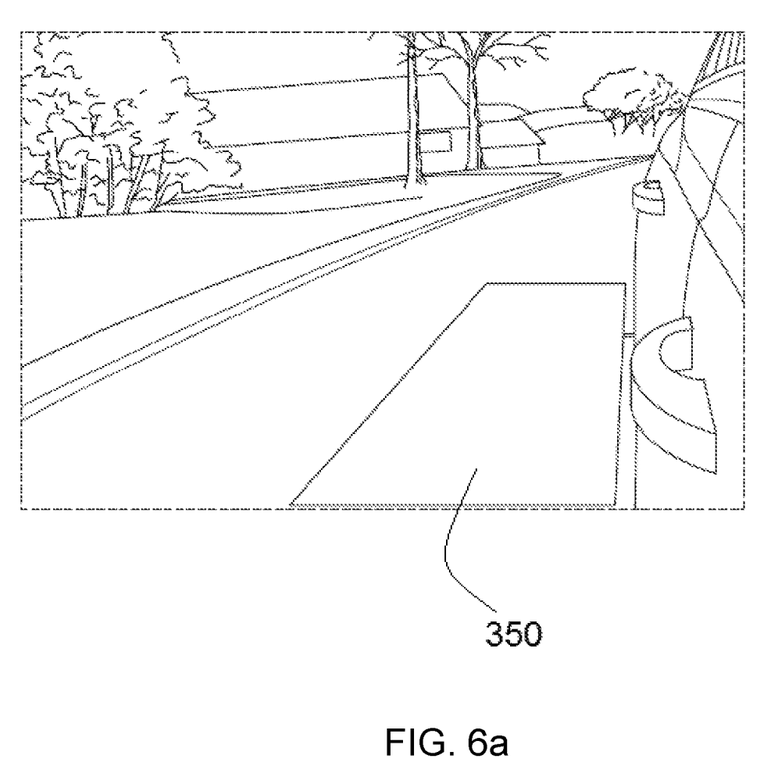
FIGS. 6a-6b schematically illustrate an example of a ground plane mask and a normal ground plane vector.

At block 205, a ground plane mask in the image plane may be identified. The identification of the ground plane mask may be performed by indicating a region of interest (ROI) in the image plane. A ROI 350 is schematically depicted in FIG. 6a. The corresponding ground plane mask may thus be selected.

At block 206, three or more flow vectors located in the ground plane mask, i.e., ground plane flow vectors may be identified. The reasoning of selecting three or more flow vectors is that it may be necessary to obtain a 3D plane of at least three flow vectors. Ground plane flow vectors may be obtained as hereinbefore described at block 203. Similarly, as before, the identified ground plane flow vectors may be noisy and not reliable. A filtering may thus be performed based on at least one of the following criteria: matching based costs; flow vectors length; angle between image frames and angle with respect to an initial focus of expansion point. These filters may be the same of similar as hereinbefore described. Therefore, "good" ground plane flow vectors identified in the ground plane mask may be obtained over several frames.

At block 207, an homography matrix configured to relate the homogenous coordinates of two points forming part of one of the ground plane flow vectors located in the obtained mask ground plane may be determined. Additionally, at block 208, one or more plane normal vectors using the homography matrix may be obtained. An homography matrix $H \in R3 \times 3$ may map two homogenous coordinates of two points (between two frames) forming part of one ground plane flow vector. The homography matrix may be expressed as:

wherein $I \in R^{3 \times 3}$ is an identity matrix, $t \in R^3$ is a translation of the camera, $n \in R^3$ is a plane normal vector and $d \in R$ is a distance of the plane to the camera center. This way, two homogeneous coordinates p1 and p2 of two points (between two frames) forming part of one ground plane flow can be related in accordance with the following formula:

$$\lambda p2 = \left(I + t\frac{n^T}{D}\right)p1 = (I + tm^T)p1$$

wherein $\lambda$ is an unknown scalar and $m=n/d$. At this point, going back to the image coordinates and dividing by a third component of the homogeneous coordinates yields the following two constraints:

$$p_{2x} = \frac{(p_{1x} + t_x m^T p1)}{(1 + t_z m^T p1)}$$

$$p_{2y} = \frac{(p_{1y} + t_x m^T p1)}{(1 + t_z m^T p1)}$$

Small reformulations may lead to the following equations:

$$p_{2x} - p_{1x} = (t_x - p_{2x} t_z) p1^T m$$

$$p_{2y} - p_{1y} = (t_y - p_{2y} t_z) p1^T m$$

Following the example, m may be computed by minimizing a cost function in accordance with the following equation:

$$E(m) = \sum_{i=1}^{n} \left(((t_x - p_{i2x} t_z) p_{i1}^T m - (p_{i2x} - p_{i1x}))^2 + ((t_y - p_{i2y} t_z) p_{i1}^T m - (p_{i2y} - p_{i1y}))^2\right)$$

Wherein n is the number of correspondences. This cost function can be reformulated in accordance with the following equation:

$$E(m) = (Am - b)^2$$

The term m may be computed in accordance with the following formula:

$$m = (A^T A)^{-1} A^T b$$

wherein:

$$A^T A = \sum_{i=1}^{n} ((t_x - p_{i2x} t_z)^2 + (t_y - p_{i2y} t_z)^2) p_{i1} p_{i1}^T$$

and $$A^T b = \sum_{i=1}^{n} ((t_x - p_{i2x} t_z)(p_{i2x} - p_{i1x}) + (t_y - p_{i2y} t_z)(p_{i2y} - p_{i1y})) p_{i1}$$

Figure 6B:
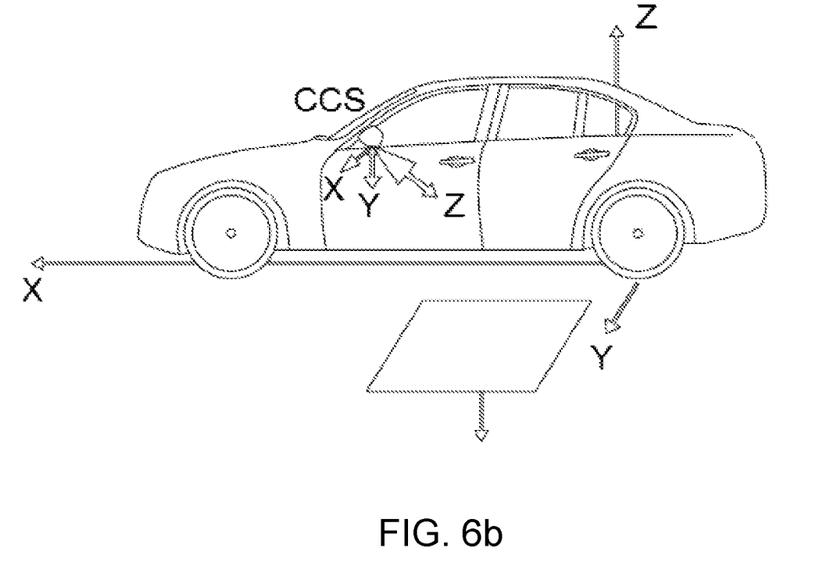

The plane normal vector is given by n=d*m wherein $$d = \frac{1}{|m|}$$

is the computed distance to the camera center. An example of a plane normal vector is schematically shown in FIG. 6b.

In some examples, the plane normal vector n may be estimated by the RANSAC algorithm. The advantages of using RANSAC may be the same as hereinbefore described.

Evidently, further plane normal vectors may be obtained in a substantially similar way. In examples wherein further plane normal vectors are obtained, the plane normal vectors may be filtered. The filtering may be performed by calculating an average of the plane normal vectors obtained. A single plane normal vector may thus be obtained.

At block 209, a camera calibration matrix e.g., a rotation matrix comprising a first column r1, a second column r2 and a third column r3 may be obtained. The camera calibration matrix may be represented in accordance with:

$$R = (r1, r2, r3)$$

Particularly, at block 210, a first column of the camera calibration matrix based on the obtained focus of expansion points is determined. In this respect, a transformation of the x-axis from a coordinate system of a vehicle to a coordinate system of a vehicle camera may be determined in accordance with:

$$r_1 = R \cdot \begin{pmatrix} 1 \\ 0 \\ 0 \end{pmatrix}$$

wherein r1 is the first column of the camera calibration matrix. An average focus of expansion point (avp) has already been obtained as hereinbefore described. The average focus of expansion point is defined by x, y coordinates. The focus of expansion point may be normalized. A normalized focus of $$nvp=(vp-pp)/fl$$

expansion point (nvp) may thus be obtained. The normalized focus of expansion point (nvp) may be expressed as:
wherein the normalized focus of expansion point is represented by a principal point of the camera (pp), a focal length of the camera and the average focus of expansion point (vp). A z coordinate (n_vp.z) may be added to the 2D normalized focus of expansion point. The z-coordinate may be, for example, 1. A 3D focus of expansion point may thus be obtained. The 3D focus of expansion point (VP_3D) may be represented in accordance with:

$$VP\_3D=(n\_vp.x,n\_vp.y,n\_vp.z)$$

Then, a normalized 3D focus of expansion point may be obtained based on the 3D focus of expansion point. The normalized 3D focus of expansion (VP_3D_norm) may be obtained in accordance with:

$$VP\_3D\_norm = \sqrt{n\_vp.x^2 + n\_vp.y^2 + n\_vp.z^2}$$

The normalized 3D focus of expansion point (VP_3D_norm) may be added to the first column r1 of the camera calibration matrix.

At block 211, a third column r3 of the camera calibration matrix based on the obtained plane normal vectors may be determined. A transformation of the z-axis from a coordinate system of a vehicle to a coordinate system of a vehicle camera may be determined in accordance with:

$$r_3 = R \cdot \begin{pmatrix} 0 \\ 0 \\ 1 \end{pmatrix}$$

A normal vector e.g. an average plane normal vector has already been obtained as hereinbefore described. The normal vector r3 may thus be added to the third column r3 of the camera calibration matrix.

At block 212, a second column r2 of the camera calibration matrix corresponding to the cross-product of the first column r1 and the third column r3 of the camera calibration matrix may be obtained. Further, the vector r2 may be added to the second column of the camera calibration matrix.

As a result, a camera calibration matrix R=(r1, r2, r3) may be formed. In some examples, the computation may lead to vectors r1 and r3 which are not perpendicular. In this particular example, the vector r3 may be projected into a plane with normal vector r1. This may ensure the orthogonality of the camera calibration matrix.

At block 213, the camera may be calibrated using the obtained camera calibration matrix. Once the calibration matrix is obtained, the corresponding pitch, roll and yaw of the camera may also be obtained. For example, if the obtained calibration matrix is determined in accordance with:

$$R = \begin{pmatrix} r_{11} r_{12} r_{13} \\ r_{21} r_{22} r_{23} \\ r_{31} r_{32} r_{33} \end{pmatrix}$$

The roll may be computed in accordance with the following formula:

$$\partial_x = a\tan(r_{32}, r_{33})$$

The pitch may be computed in accordance with the following formula:

$$\partial_y = a\tan(-r_{31}, \sqrt{r_{32}^2 + r_{33}^2})$$

The yaw may be computed in accordance with the following formula:

$$\partial_z = a\tan(r_{21}, r_{11})$$

Figure 7:
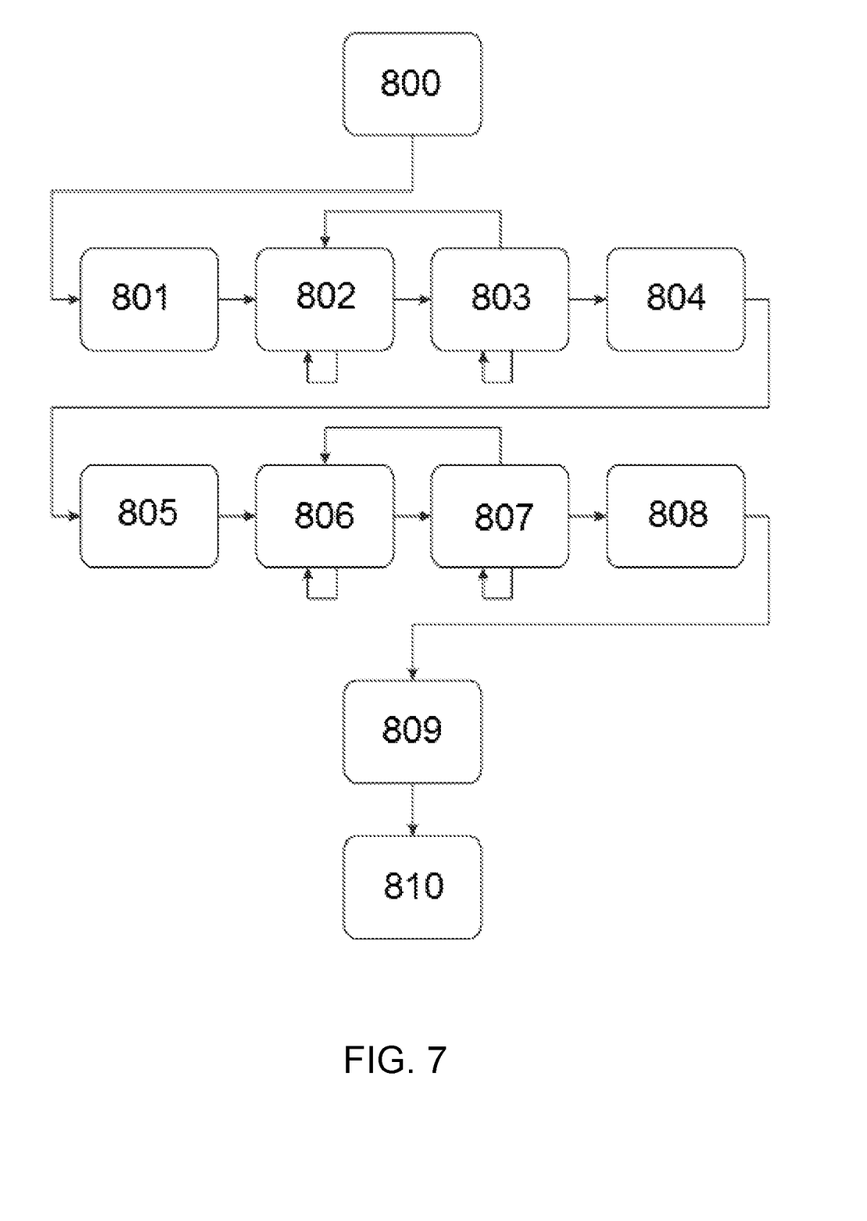
FIG. 7 is an illustration of a flowchart describing another example of a method for calibrating a camera of a vehicle.

FIG. 7 shows a flowchart of another example of a method for calibrating the camera. The operation of the flow chart is as follows:

The method can be started at block 800. At block 801, the focus of expansion point computation may be initialized. The initialization may comprise the initialization of buffers and the computation of a distortion matrix. Then, at block 802, flow vectors may be collected and generated. The flow vectors may be generated as hereinbefore described.

The flow vectors may be filtered as hereinbefore described. Particularly, if the steering rate is not within a predefined steering range, the collection of the flow vectors may be stopped.

At block 802, one or more focus of expansion points may be estimated based on the flow vectors. As commented above, focus of expansion points i.e., vanishing points may be estimated by the RANSAC algorithm. The RANSAC computation may be distributed over several frames. Run-time requirements may thus be met. Moreover, it is checked whether enough focus of expansion points has been collected and/or a predefined time has been exceed. In case of positive result in checking, a filtering 804 of the focus of expansion points may be performed as hereinbefore described. The filtering may comprise performing an average of the flow vectors obtained. An average focus of expansion point may thus be obtained. In case of negative result in checking, more flow vectors may be collected at block 802.

At block 805, the ground plane computation may be initialized. At point 806, ground plane flow vectors may be collected. The ground plane flow vectors may be filtered as hereinbefore described. Particularly, if the steering rate is not within a predefined steering range, the collection of the ground plane flow vectors may be stopped. At point 807, an homography with the collected ground plane flow vectors may be computed. Then, one or more ground plane normal vectors may be obtained. The ground plane normal vectors may be estimated by the RANSAC algorithm. Moreover, it is checked whether enough ground plane normal vectors have been collected and/or a predefined time has been exceeded. In case of positive result in checking, a filtering 808 of the normal vectors may be performed as hereinbefore described. An average normal vector may thus be obtained. In case of negative result in checking, more ground plane flow vectors may be collected at block 806.

At block 809, a camera calibration matrix is computed as hereinbefore described. Then, the method can be finished at block 810.

The camera calibration matrix may be used to calibrate the camera.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow. If reference signs related to drawings are placed in parentheses in a claim, they are solely for attempting to increase the intelligibility of the claim and shall not be construed as limiting the scope of the claim.

What is claimed is:

1. A method of calibrating a camera of a vehicle comprising:
   obtaining one or more image frames in a video stream from the camera while the vehicle is in motion, wherein the one or more images frames define an image plane;
   selecting two or more image points in the one or more image frames;
   tracking a motion trajectory of each selected image point in the one or more image frames;
   obtaining a plurality of flow vectors based on the tracked motion trajectory;
   determining one or more focus of expansion points for the plurality of flow vectors in the image plane, wherein each focus of expansion point is defined by x, y coordinates;
   identifying a ground plane mask in the image plane;
   identifying three or more flow vectors of the obtained plurality of flow vectors located in the ground plane mask;
   determining an homography matrix configured to relate homogeneous coordinates of two image points of one of the plurality of flow vectors located in the ground plane mask;
   obtaining one or more plane normal vectors using the homography matrix; and
   generating a camera calibration matrix comprising a first column, a second column, and a third column by:
      determining the first column of the camera calibration matrix based on the obtained one or more focus of expansion points;
      determining a third column of the camera calibration matrix based on the obtained one or more plane normal vectors;
      determining a second column of the camera calibration matrix corresponding to a cross-product of the first and the third column of the camera calibration matrix; and
      calibrating the camera using the camera calibration matrix.

2. The method according to claim 1, wherein obtaining the plurality of flow vectors based on the tracked motion trajectory comprises:
   flipping the flow vectors such that flow vectors corresponding to non-mirrored image frames are obtained.

3. The method according to claim 1, wherein obtaining the plurality of flow vectors comprises:
   filtering the plurality of flow vectors.

4. The method according to claim 3, wherein filtering the plurality of flow vectors is performed based on at least one of the following criteria:
   matching based costs;
   flow vectors length;
   a first angle between image frames; and
   a second angle with respect to an initial focus of expansion point.

5. The method according to claim 1, wherein determining the one or more focus of expansion points comprises:
   filtering the focus of expansion points by calculating an average of the focus of expansion points such that an average focus of expansion point (vp) is obtained.

6. The method according to claim 5, wherein determining the first column of the camera calibration matrix based on the focus of expansion points comprises:
   obtaining a normalized focus of expansion point (nvp), wherein the normalized focus of expansion point is represented by a principal point of the camera (pp), a focal length of the camera (fl) and the average focus of expansion point (vp) as in the following equation:

$$nvp=(vp-pp)/fl$$

adding a z-coordinate to the normalized focus of expansion point (nvp) such that a 3D focus of expansion point (VP_3D) is obtained, wherein a 3D focus of expansion point (VP_3D) is represented in accordance with:

$$VP\_3D=(n\_vpx, n\_vp.y, n\_vp.z)$$

obtaining a normalized 3D focus of expansion point (Vp_3D_norm), wherein the normalized 3D focus of expansion point is determined as in the following equation:

$$VP\_3D\_norm=\sqrt{n\_vp.x^2+n\_vp.y^2+n\_vp.z^2}$$

adding the normalized 3D focus of expansion point (Vp_3D_norm) to the first column of the camera calibration matrix.

7. A method according to claim 1, wherein identifying a ground plane mask comprises:
   indicating a region of interest (ROI) in the image plane.

8. The method according to claim 1, wherein the homography matrix is configured to relate the homogeneous coordinates of two image points of the flow vectors located in the ground plane mask as represented by an identity matrix (I), a translation of the camera (t), a plane normal vector (n) and a distance of the image plane to a camera center (d) as in the following equation:

$$I+t\frac{n^T}{d}.$$

9. The method according to claim 1, wherein obtaining one or more plane normal vectors comprises:
   filtering the plane normal vectors by calculating an average of the plane normal vectors such that an average plane normal vector is obtained.

10. The method according to claim 1, further comprising:
    receiving a steering angle of the vehicle; and
    confirming whether the steering angle is within a predefined steering angle range prior to obtaining one or more image frames.

11. A computer program comprising program instructions for causing a computing system to perform a method according to claim 1.

12. The computer program according to claim 11 being embodied on a storage medium.

13. A computing system comprising a memory and a processor, embodying instructions stored in the memory and executable by the processor, the instructions comprising functionality to execute the method of claim 1.

14. A system for calibrating a camera of a vehicle, the system comprising:
 memory; and
 a processor including the memory and being configured to:
  obtain one or more image frames in a video stream from the camera while the vehicle is in motion, wherein the one or more image frames define an image plane,
  select two or more image points in the one or more image frames obtained by the camera,
  track a motion trajectory of each selected image point in the one or more image frames, and
  obtain a plurality of flow vectors based on the tracked motion trajectory;
 a focus of expansion point module connected to the camera to be calibrated, wherein the focus of expansion point module is configured to:
  determine one or more focus of expansion points for the obtained plurality of flow vectors in the image plane;
 a ground plane module connected to the camera to be calibrated, wherein the ground plane module is configured to:
  identify a ground plane mask in the image plane;
  identify three or more flow vectors of the obtained plurality of flow vectors located in the ground plane mask;
  determine an homography matrix that is configured to relate homogeneous coordinates of two image points of one of the obtained plurality of flow vectors located in the ground plane mask;
  obtain one or more plane normal vectors using the homography matrix; and
 a camera calibration matrix module connected to the focus of expansion point module and to the ground plane module, wherein the camera calibration matrix module is configured to:
  generate a camera calibration matrix comprising a first column, a second column, and a third column by:
   determining a first column of the camera calibration matrix based on the obtained one or more focus of expansion points;
   determining a third column of the camera calibration matrix based on the obtained one or more plane normal vectors;
   determining a second column of the camera calibration matrix corresponding to a cross-product of the first and the third column of the camera calibration matrix; and
  calibrating the camera using the camera calibration matrix.

15. A method for calibrating a camera of a vehicle comprising:
 obtaining one or more image frames in a video stream from the camera, the one or more images frames defining an image plane;
 selecting two or more image points in the one or more image frames;
 tracking a motion trajectory of each selected image point;
 obtaining a plurality of flow vectors based on the tracked motion trajectory;
 determining one or more focus of expansion points for the plurality of flow vectors in the image plane;
 identifying a ground plane mask in the image plane;
 identifying a first number of flow vectors of the obtained plurality of flow vectors located in the ground plane mask;
 determining an homography matrix configured to relate homogeneous coordinates of two image points of one of the first number of flow vectors located in the ground plane mask;
 obtaining one or more plane normal vectors using the homography matrix; and
 generating a camera calibration matrix comprising a first column, a second column, and a third column by:
  determining the first column of the camera calibration matrix based on the obtained one or more focus of expansion points;
  determining a third column of the camera calibration matrix based on the obtained one or more plane normal vectors;
  determining a second column of the camera calibration matrix corresponding to a cross-product of the first and the third column of the camera calibration matrix; and
 calibrating the camera using the obtained camera calibration matrix.

16. The method according to claim 15, wherein obtaining the plurality of flow vectors based on the tracked motion trajectory comprises:
 flipping the flow vectors such that flow vectors corresponding to non-mirrored image frames are obtained.

17. The method according to claim 15, wherein obtaining the plurality of flow vectors comprises:
 filtering the plurality of flow vectors.

18. The method according to claim 17, wherein filtering the plurality of flow vectors is performed based on at least one of the following criteria:
 matching based costs;
 flow vectors length;
 a first angle between image frames; and
 a second angle with respect to an initial focus of expansion point.

19. The method according to claim 15, further comprising:
 receiving a steering angle of the vehicle; and
 confirming whether the steering angle is within a predefined steering angle range prior to obtaining one or more image frames.

20. A computer program comprising program instructions for causing a computing system to perform a method according to claim 15.

* * * * *